US007471703B2

(12) United States Patent
del Rio Herrero et al.

(10) Patent No.: US 7,471,703 B2

(45) Date of Patent: Dec. 30, 2008

(54) ROUTING METHOD AND DEVICE FOR A DIGITAL MULTIPLEX SYSTEM

(75) Inventors: Oscar del Rio Herrero, Leiden (NL); Xavier Maufroid, Ham-Sur-Heure (BE)

(73) Assignee: Agence Spatiale Europeenne (FR)

( * ) Notice: Subject to any disclaimer, the term of this patent is extended or adjusted under 35 U.S.C. 154(b) by 823 days.

(21) Appl. No.: 10/706,728

(22) Filed: Nov. 12, 2003

(65) Prior Publication Data

US 2004/0136410 A1 Jul. 15, 2004

(30) Foreign Application Priority Data

Nov. 22, 2002 (FR) .................................. 02 14637

(51) Int. Cl.
*H04J 3/04* (2006.01)

(52) U.S. Cl. ...................................... 370/535; 370/536

(58) Field of Classification Search ................. 370/535
See application file for complete search history.

(56) References Cited

U.S. PATENT DOCUMENTS

| | | | | |
|---|---|---|---|---|
| 5,341,369 | A * | 8/1994 | Langer | 370/392 |
| 6,288,808 | B1 * | 9/2001 | Lee et al. | 398/49 |
| 2002/0057861 | A1 * | 5/2002 | Ge et al. | 385/16 |
| 2002/0146027 | A1 | 10/2002 | Chang et al. | |

FOREIGN PATENT DOCUMENTS

| | | | |
|---|---|---|---|
| EP | 1 089 461 | A | 4/2001 |
| WO | WO 91/01603 | A | 2/1991 |

OTHER PUBLICATIONS

International Search Report.
Eramo et al., "Comparison of Unicast/Multicast Optical Packet Switching Architectures Using Wavelength Conversion", *Optical Networks Magazine*, vol. 3, No. 2, Mar. 2002, pp. 63-75.

* cited by examiner

*Primary Examiner*—Chirag G Shah
*Assistant Examiner*—Suk Jin Kang
(74) *Attorney, Agent, or Firm*—Alston & Bird LLP

(57) ABSTRACT

A routing method for a multiplex system implements the following operations: For the data, multiplexing N input channels each having M multiplexed packets to generate an aggregate multiplex signal comprising all data packets representing the N input multiplexes. For each of N' outputs, providing the inputs of M+L parallel selection chains with access to the aggregate multiplexed signal. For input headers, performing demodulation and decoding. For output headers, performing encoding and modulation on the basis of the demodulated and decoded input headers. For the headers and the data, selecting from n of M+L selection chains corresponding to the $k^{th}$ output on the basis of the input headers corresponding to n packets that are to be routed to the $k^{th}$ of the N' outputs, the corresponding n data packets in the aggregate multiplexed signal and multiplexing these n data packets with an output header to generate the $k^{th}$ output multiplex.

8 Claims, 4 Drawing Sheets

ROUTING METHOD AND DEVICE FOR A DIGITAL MULTIPLEX SYSTEM

CROSS-REFERENCE TO RELATED APPLICATIONS

This application claims priority from France Application No. 0214637 entitled “Procede et Dispositif de Routage Pour un Systeme Multiplex Numerique,” filed Nov. 22, 2002, which is hereby incorporated herein in its entirety by reference.

The present invention provides a routing method and device for a multiplex system having N inputs and N' outputs, in which each input is designed to receive one of the N input multiplexes, each of which is constituted by M packets, for example code or frequency-division multiplexed packets in a time division multiple access (TDMA) system, each of the packets corresponding to an input channel, and in which each output is designed to generate one of the N' output multiplexes, e.g. a code or a frequency-division multiplex, each output multiplex being constituted by packets, each of which corresponds to an output channel.

BACKGROUND OF THE INVENTION

In such a known system, the input multiplex comprises both digital data and header information (“signaling”) serving firstly to identify said packets and secondly to specify the output to which the packet is to be routed.

Routing methods are already known, one of which relies on implementing predetermined routing tables, and another of which implies demodulating and decoding all of the information contained in the packets (data and headers).

The first known method, used in particular in the Euroskyway and Ibis systems, makes use of regeneration on board a satellite of uplink signals that are organized in frames. Each frame contains a certain number of time sub-slots, each containing an MPEG2-TS packet or an ATM cell. The processor on board the satellite contains routing tables preloaded into a memory and providing routing information corresponding to the packet in each time sub-slot of the frame. As a result, packets are routed by a switching procedure of the kind that could be performed by a circuit, i.e. there is no self-routing of the packets. The routing tables are loaded from one or more terrestrial stations (e.g. a network control center) and they can be updated every second. Those communications systems operate in a meshed network with an accumulated data rate for the system of the order of 1 gigabit per second (Gbit/s) shared between a few tens of user beams, e.g. 30 beams.

The second known method, as used in particular in the Astrolink and Spaceway systems, implements regeneration on board a satellite of packets received from an up link, and switching or routing is performed on the basis of self-routing. Reference can be made in particular to the article by W. Buerkle and M. Trefz entitled “On-board switching architectures for multimedia satellite systems” published in Space Communications 17 (2001), pages 215-229.

Such a method implies demodulating and decoding all of the information contained in the packets (digital data and headers) on board the satellite, which not only implies a large quantity of processing, but also implies a loss of flexibility, in particular concerning packet modulation and encoding. Demodulated packets are stored in a buffer memory and the headers are extracted to enable the desired routing function to be performed. When two (or more) packets have to be routed to the same downlink, a contention problem arises which is solved by putting one (or more) packets into memory while another packet is being routed to the contenting downlink. Any packets stored in the buffer memory are subsequently routed one after another to the downlink.

A switching circuit (a “crossbar” system or by a shared memory) is implemented for routing the packets to the corresponding outputs. In all cases, there exists a queue for the packets, whether at the input, in the shared memory, or at the output, depending on the technology that is implemented. This process of storing in a buffer memory leads to a delay in the switching process and might constitute a bottleneck in future satellite systems of very large bandwidth (accumulated data rates of the order of 50 Gbit/s). At the output, after routing, the packets are formatted, encoded, and modulated prior to being transmitted. Such systems are generally capable of accommodating an accumulated data rate of a few gigabits (e.g. 5 Gbit/s) which is shared over several tens of user beams (about 30), and they are compatible with multicasting, at the cost of duplicating data on board the satellite.

OBJECTS AND SUMMARY OF THE INVENTION

An object of the present invention is to provide a method and device enabling at least one of the above drawbacks to be overcome.

An object of the invention is to provide a method and a device enabling received packets to be routed in a transparent way, i.e. without there being any need to demodulate and decode the information contained in said packets, and thus providing flexibility with regards to future developments in communications standards.

Another object of the invention is to provide a method and device that enable routing to be performed in real time, independently of loading updates.

Another object of the invention is to provide a method and device enabling buffer memories to be omitted.

Another object of the invention is to provide a method and device presenting an architecture which, for given binary data rates, makes it possible to simplify processing compared with the prior art.

Another object of the invention is to provide a method and device operating with architecture that enables the binary data rate to be increased compared with prior art architecture implementing a processor of the same complexity.

Another object of the invention is to provide a method and device enabling the access method and the routing function to be combined effectively so as to simplify the complexity of the architecture.

Another object of the invention is to provide a method and device that enable a large number of beams to be processed and/or enabling a large bandwidth to be processed.

Another object of the invention is to provide a method and device enabling inter-beam connectivity and/or multicasting.

Another object of the invention is to provide a method and device enabling the problem of contention to be solved without using buffer memories, whenever more than two packets and advantageously more than M packets need to be routed to the same downlink within the same frame duration Δ.

At least one of the above objects is achieved by a “transparent” routing method for a system having N inputs, each of which is designed to receive one of N input multiplexes each of which is constituted by M input channels each of which is designed to transport one packet, and having N' outputs each of which is designed to generate one of N' output multiplexes each of which is constituted by output channels each of which is designed to carry one output packet, each of the M channels used in the input multiplex having a data packet associated with a header serving firstly to identify it and secondly to specify at least one output to which it is to be routed, wherein each of the N' output multiplexes comprises (M+L) channels with L≧0 (and can thus multiplex M+L output packets), and wherein the method implements:

for the data, multiplexing the N input multiplexes each comprising no more than M multiplexed packets to generate an aggregate multiplexed signal comprising data packets (i.e. a maximum of M×N data packets) representing all of said data, and for each of the N' outputs, providing the input of (M+L) parallel selection chains with access to the aggregate multiplexed signal;

for the input headers, demodulation and decoding;

for the output headers, encoding and modulation on the basis of the demodulated and decoded input headers; and for the headers and the data, selecting in n out of the (M+L) selection chains corresponding to the $k^{th}$ output and from the input headers corresponding to the n packets that are to be routed to the $k^{th}$ of the N' outputs, for k=1, 2, . . . , N', the n corresponding data packets from the aggregate multiplexed signal, and multiplexing these n data packets with the corresponding n output headers in order to generate the $k^{th}$ output multiplex.

Since only the header information is decoded, and since the data is neither demodulated nor decoded, and since it is possible completely to omit any buffer memory, processing load is considerably reduced, thus enabling the increase of the binary data rate for given processing capacity, or the use of a processor that is simpler than in a prior art system for given binary data rate.

When L>0, the architecture is asymmetrical, and it is possible to route more than M packets to the same downlink without a problem of contention.

Each of the input multiplexes may contain data packets (the number of these packets being less than or equal to M, depending on the extent to which the channels in the beam to which it corresponds are full) together with input headers, and the method then implements demultiplexing on each of the N input multiplexes to separate the headers from the data packets. The headers associated with the packets of the input are transmitted on an input signalling channel, for example, incorporated in the input multiplex.

Said selection may advantageously comprise the following operations:

a preliminary selection operation to select from the aggregate multiplexed signal the input multiplex(es) containing the data packets that are to be routed to the $k^{th}$ output; and packet selection operation to select from each of said input multiplexes selected in this way the data packet(s) to be routed to the $k^{th}$ output.

In the method, the generation of the aggregate multiplexed signal implements code- or frequency- or wavelength-division multiplexing for the N input multiplexes, a code or a frequency (or a wavelength in the optical case) being allocated to each input multiplex, and said preliminary selection operation implements demultiplexing using said code or said frequency or wavelength as appropriate.

Selection can then implement first code- or frequency- or wavelength-division demultiplexing to perform preliminary selection and second code- or frequency-division demultiplexing to perform said packet selection.

Advantageously, said multiplexing of selected data packets implements the following operations:

code- or frequency- or wavelength-division multiplexing of the data packets to be routed to the $k^{th}$ output; and code- or frequency- or wavelength-division multiplexing of the headers corresponding to said data packets to be routed to the $k^{th}$ output.

The selected data packets and headers corresponding to the $k^{th}$ output may be multiplexed in the output multiplex of the $k^{th}$ output, or else the headers corresponding to said selected data packets may be multiplexed separately, e.g. in an output signalling channel.

The invention also provides a device for implementing the above-defined method, the device presenting:

a first system comprising:

an N input multiplexing module for receiving and multiplexing the N input multiplexes, each of which comprises up to M multiplexed packets, and for generating as output said aggregate multiplexed signal;

a distributor circuit such as a bus for distributing said aggregate multiplexed signal to an input of each of N' processing chains each allocated to one of the N' outputs of the device and each presenting (M+L) selection circuits in parallel; and each selection circuit presenting in series a beam selector, a channel selector, and a channel converter, the channel converter having the function of placing each of the n output packets of a given output on different channels; and a second system comprising:

a demodulation and decoding circuit presenting N inputs for receiving the headers corresponding to the data packets in each of the N input multiplexes and for demodulating and decoding said headers;

a processor circuit for processing the demodulated and decoded input headers to configure the beam selector and the channel selector in at least some of the M+L selection circuits in each of the processing chains so that each said selection circuit selects a packet for routing to the output with which it is associated:

a header generator module for generating, for each output, the output headers corresponding to each of the n output data packets from said selection circuits of said output; and an encoder and modulator circuit for encoding and modulating the output headers previously generated by the header generator module;

and wherein, for each of said selection circuits, the channel converter presents means for adding to each of said data packets an output channel identification signal in order to place said n data packets belonging to the same output on different channels;

and wherein the device includes an output multiplexer module for each of said N' outputs of the device to multiplex the data packets allocated to said outputs with the output headers corresponding to said packets.

BRIEF DESCRIPTION OF THE DRAWINGS

Other characteristics and advantages of the invention appear better on reading the following description given with reference to the accompanying drawings, in which.

MORE DETAILED DESCRIPTION

The purpose of routing is to enable each of the signals located in any one of the M channels of a given up link to be multiplexed to any one of the downlinks. In other words, the purpose of the method is to enable a packet from any channel of any input beam to be routed to any output beam, depending on routing information contained in its header.

Figure 1:
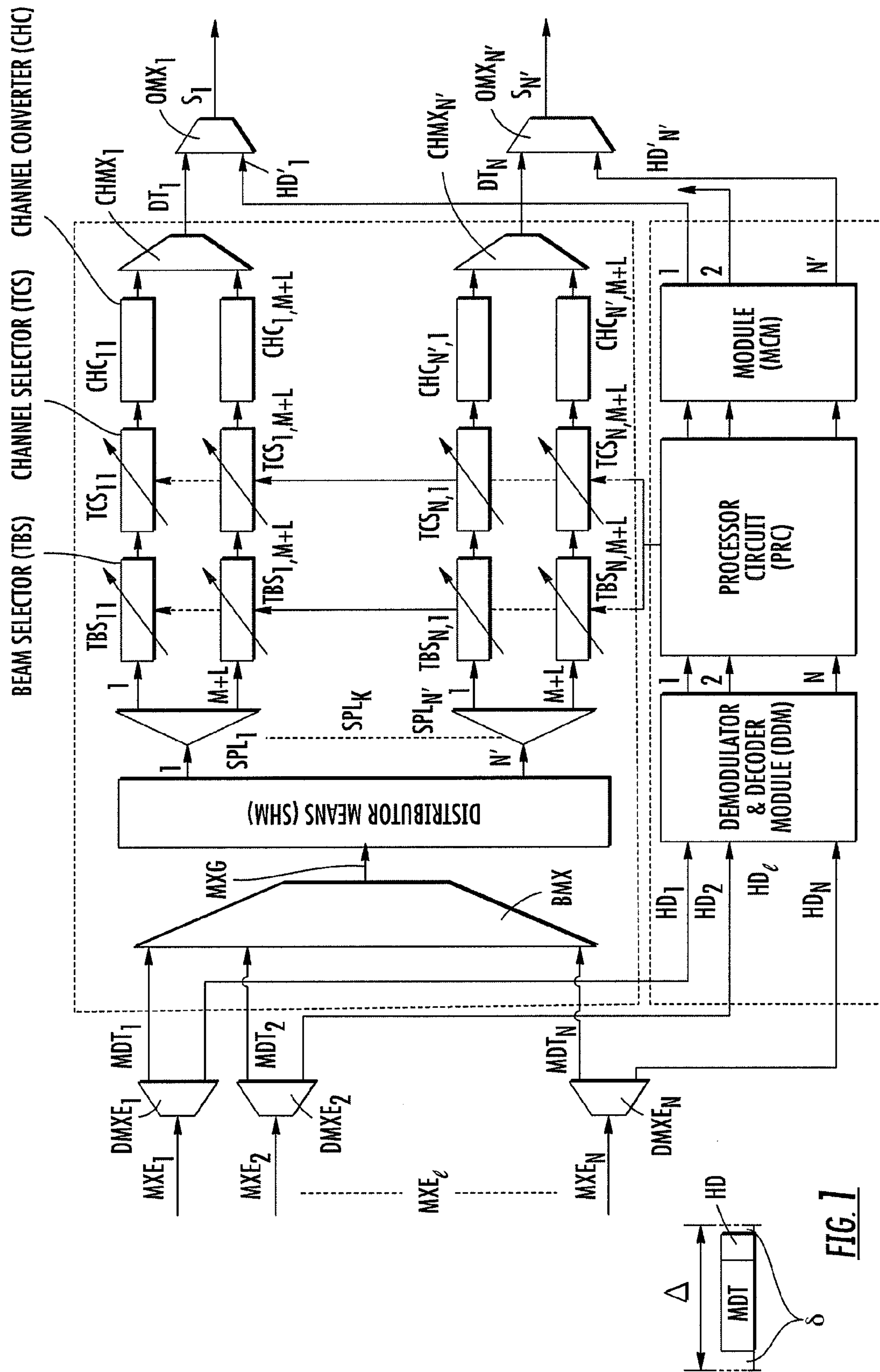
FIG. 1 is a general diagram showing the method of the invention with L>0.

With reference to FIG. 1, there can be seen N signals comprising multiplexed packets, e.g. in code division (C/TDMA) or in frequency division (MF/TDMA) corresponding to N radio beams each having M channels and received by a satellite antenna. The N signals are transposed in conventional manner in analog frequency form to an intermediate frequency IF so as to form N input multiplexed signals $MXE_1$, $MXE_2$, . . . , $MXE_N$.

These N input multiplexed signals $MXE_1$, . . . , $MXE_N$ are constituted, for each input, by a group MDT of M packets, each of which groups is associated with a respective group HD of M headers. Each of the M packets contains information relating to one of the M channels of the multiplexed signal of which it forms a part. For each input multiplex, the groups HD which correspond to the groups MDT of M packets generally form part of an information channel integrated in each input multiplex. The groups of M packets and the groups HD are transmitted in successive frames of duration Δ. The N input multiplexes $MXE_1$, $MXE_2$, . . . , $MXE_N$ are applied to the inputs of M input demultiplexers $DMXE_1$, $DMXE_2$, . . . , $DMXE_N$ which have two outputs each, on which they deliver respectively digital header signals $HD_1$, $HD_2$, . . . , $HD_N$, and digital multiplexes $MDT_1$, $MDT_2$, . . . , $MDT_N$ each containing the M data packets of each input multiplex $MXE_1$, . . . $MXE_N$.

Each header contains routing information (i.e. the identity of the output beam) and possibly also other information (e.g. priority information).

For a multibeam satellite system, the signals at the intermediate frequency IF from each beam are supplied by radiofrequency (RF) or intermediate frequency (IF) stages situated upchain (antenna circuits, amplifiers, frequency changers, beam-forming circuits) and they carry both signals representative of the beam ("signaling") and the M data channels that are code-division multiplexed (C/TDMA) or frequency-division multiplexed (MF/TDMA).

The N data multiplexes $MDT_1$, $MDT_2$, . . . , $MDT_N$, each of which comprises M data packets $P_1$, $P_2$, . . . , $P_M$ and the groups $HD_1$, $HD_2$, . . . , $HD_N$ are processed in parallel in order to perform the desired switching.

It should be observed that a technique suitable for a terrestrial switching network of the Internet type enabling packets to be routed by separating headers and data packets is known from the article "Techniques for optical packet switching and optical burst switching" by Lisong Xu et al. (IEEE Communications Magazine, January 2001, pages 136-142).

The data multiplexes $MDT_1$, $MDT_2$, . . . , $MDT_N$ are multiplexed with one another e.g. in code-division or frequency-division or wavelength-division (in an optical system) in a beam multiplexer (BMX) which outputs an aggregate multiplex signal MXG which represents all of the data signals of the entire system for a given time slot. During this multiplexing, each data signal $MDT_1$, . . . , $MDT_N$ has associated therewith a distributed beam code (or frequency or wavelength) $\omega_1$, . . . , $\omega_N$ identifying the up beam from which it comes. The aggregate multiplex signal MXG as generated in this way is supplied to distributor means SHM, e.g. a digital bus (or an optical fiber).

As an example, a code-division switching architecture is described in the article by D. Gerakoulis and E. Geraniotes entitled "A code-division switch architecture for satellite applications" published in IEEE Journal on Selected Areas in Communication, Vol. 18, No. 3, pages 481-495 (March 2000).

In that article, the technique uses a code which is associated with the destination beam.

In the technique of the invention, and as described below, the signals of each beam are, on the contrary, identified by the beam code (or frequency or wavelength) $\omega_l$ corresponding to the uplink beam (l varying over the range 1 to N).

The above-mentioned digital (or optical) bus is connected to the inputs of N' main chains (e.g. N'=N) each having an input stage constituted by a splitter $SPL_1$, $SPL_2$, . . . , $SPL_N$ each of which gives the multiplex signal MXG access to each of its M+L outputs feeding a respective selection chain (TBS, TCS, CHC). Each splitter, which may be constituted by a secondary bus for example, is allocated to an output $S_1$, . . . , $S_N$, which corresponds in this example to a downlink beam as transmitted by the satellite. The fact of having M+L channels (where L>0) for each output compared with the M input channels creates asymmetry for the purpose of solving problems of contention when routing more than M packets to the same output and/or makes it possible to handle multicasting effectively, thereby reducing the probability of packets being lost, with this probability decreasing for increasing L, other things remaining equal.

The header groups $HD_1$, $HD_2$, . . . , $HD_N$ are demodulated and decoded in a demodulator and decoder module DDM whose outputs are fed to the inputs of a processor circuit PRC which serves:

- firstly to associate with the M+L selection chains fed by each splitter $SPL_1$, $SPL_2$, . . . , $SPL_N$. the input headers which correspond to the downlinks or outputs to which they are allocated so as to perform the beam and channel selection that is described below; and
- secondly to generate the channel signaling for insertion into the output headers corresponding to the packets of the output multiplex of each output, e.g. each downlink beam output, depending on the routing information contained in the header groups $HD_1$, . . . , $HD_N$.

Each of the N' main chains has a splitter $SPL_k$ (for k=1, 2, . . . , N') presenting M+L outputs, each of which feeds a selection chain comprising a beam selector TBS, a channel selector TCS, and a channel converter CHC. The outputs of the M+L channel converters $CHC_{k1}$, $CHC_{k2}$, . . . , $CHC_{k(M+L)}$ feed the M+L inputs of a channel multiplexer $CHMX_1$, $CHMX_2$, . . . , $CHMX_k$, . . . , $CHMX_{N'}$ whose output generates a multiplex of M+L data packets containing the data to be sent to the corresponding output, e.g. to constitute a downlink beam signal. When the output multiplex includes headers, an output multiplexer $OMX_1$, . . . , $OMX_k$, . . . , $OMX_{N'}$ is provided for each of the outputs ($S_1$, $S_2$, . . . , $S_{N'}$) in such a manner as to insert header groups $HD'_1$, . . . , $HD'_{N'}$. Alternatively, the header groups may be multiplexed with one another and sent via an independent service channel associated with each of the outputs, for example.

The technique of multiplexing channels is itself known for terrestrial communications networks. Wavelength division multiplexing is performed, allocating a given wavelength to a given output (wavelength-division multiplexing or WDM).

A description can be found in the following documents:

article by S. Quist et al. entitled "A new packet switching concept for high capacity networks" published in Proceedings of the Society of Photo-optical Instrumentation, Vol. 4213, published in 2000;

article by S. Yao et al. entitled "Advances in photonic packet switching: an overview" published in IEEE Communications Magazine, pages 84-94 (February 2000);

article by M. Listanti et al. entitled "Architectural and technological issues for future optical Internet networks" published in IEEE Communications Magazine, pages 82-92 (September 2000); and article by L. Xu et al. entitled "Techniques for optical packet switching and optical burst switching" published in IEEE Communications Magazine, pages 116-122 (September 2000).

The $k^{th}$ chain with k=1, 2, . . . , N', receives from the module PRC the configuration information that results from a routing algorithm applied to the decoded headers. Each configuration enables the desired packet corresponding to the information contained in the input header to be brought onto each chain, i.e. for each packet both a code (or a frequency or a wavelength) corresponding to an uplink beam to be selected and secondly a code (or a frequency or a wavelength) corresponding to the channel containing the input packet to be selected.

Each of these codes (or frequencies or wavelengths) is used to select a packet from the (M+L) selection chains. Initially it is the group of M packets coming from that one of the N up links that contains the packet desired for the chain that is selected, e.g. by code-division demultiplexing. This preliminary selection based on the code $\omega_l$ (l varying in the range 1 to N) is followed by channel selection (e.g. using a second code-division demultiplexing operation) to select the desired packet from amongst the M packets. Alternatively, demultiplexing may be performed in frequency-division or in wavelength-division.

For the $k^{th}$ chain there may be up to M+L selection operations that are performed in parallel, depending on the number n of packets that are to be routed to the $k^{th}$ output during the time slot i of duration Δ.

The selected packets are directed to the corresponding channel converter CHC which gives each packet a channel code (or frequency or wavelength) which corresponds to the channel it is assigned to in the output signal (e.g. the first channel or the packet coming from the first selection chain, the second channel for the packet coming from the second selection chain, and so on up to M+L, it being possible for this operation to be fixed), and they are then directed to the channel multiplexer $CHMX_k$ to form the data signal $DT_k$ comprising M+L data packets corresponding to the $k^{th}$ output (e.g. by code-division or frequency-division multiplexing). The signal $DT_k$ is applied to one of the inputs of the output multiplexer $OMX_k$. The module PRC also generates the headers corresponding to the $k^{th}$ output in correspondence with their association with the M+L selection chains, each header being associated for each output with that one of the M+L output channels used which corresponds to the packet that is associated with the header. After modulation and encoding in a module MCM, the modulated header and encoded header groups $HD'_1$, . . . , $HD'_{N'}$ are directed towards the other input of the output multiplex $OMX_k$ so as to generate the output multiplex $S_1$, . . . , $S_{N'}$ at intermediate frequency that corresponds to the $k^{th}$ output (i.e. the $k^{th}$ downlink for a multibeam satellite system), by multiplexing the header groups HD' with the corresponding data packet groups DT, the headers being contained in a specific channel incorporated in the multiplex.

The routing processing performed in the context of the present invention is illustrated below for a very simple case where N=N'=2, M=2, and L=1.

It is assumed that uplink beam No. 1 presents a channel No. 1 whose packet is to be routed to downlink beam No. 1 and a channel No. 2 whose packet is to be routed to downlink beam No. 1, and also to downlink beam No. 2 (multicasting).

It is also assumed that uplink beam No. 2 presents a channel No. 1 whose packet is to be routed to downlink beam No. 2 and a channel No. 2 whose packet is to be routed to downlink beam No. 1.

Since channel 2 of the first beam needs to be routed both to the first downlink beam and to the second downlink beam, there is a routing or "contention" problem with channel 2 of the second beam which is also to be routed to the first downlink beam.

Each of the uplink beams is code-division multiplexed (codes ω1 and ω2 corresponding respectively to uplink beam No. 1 and to uplink beam No. 2) in order to generate the signal MXG that is accessible on the bus.

For the routing processing, there are three selection chains (No. 1, No. 2, and No. 3) for each of the downlink beams:

| | UPLINK BEAM No. 1 | UPLINK BEAM No. 2 |
|---|---|---|
| Chain No. 1 | Select beam No. 1 (code ω1) and channel No. 1 | Select beam No. 2 (code ω2) and channel No. 2 |
| Chain No. 2 | Select beam No. 1 (code ω1) and channel No. 2 | Select beam No. 1 (code ω1) and channel No. 2 |
| Chain No. 3 | Select beam No. 2 (code ω2) and channel No. 2 | Chain empty |

The above table shows how each selection chain associated with each downlink beam is selected twice (by code-division demultiplexing) starting from the signal MXG. Each chain associated with a downlink beam is capable of selecting any of the channels of any of the uplink beams, depending on the headers.

Each selection chain is associated with a down channel by the channel converter (chains 1, 2, and 3 corresponding respectively to channels 1, 2, and 3). The two packets that are in contention (underlined in the above table) are assigned to two different channels in the first downlink beam, thereby solving the problem of contention.

The processing described above is transparent since it does not require incoming data packets to be demodulated or decoded. Only the incoming headers are demodulated and decoded in parallel. The information in the incoming headers is carried by a separate channel (a signaling channel) which can be code-division or frequency-division multiplexed with the data, for example. Header processing enables routing to be performed as described above.

The data and the headers are supplied periodically in successive frames of duration Δ, thus defining a time window or time "slot" Δ. To enable routing to be configured in advance, it is advantageous for routing information (headers) to be supplied at the input with an advance of one time slot.

The number of routing headers received in time slot i−1 of duration Δ is equal to the number of headers needed for routing the information that is to be received during the following time slot i.

The same applies to the downlink, i.e. the headers corresponding to the output data in time slot i are sent to the output in time slot i−1. The number of headers sent to the output in time slot i−1 is equal to the number of packets sent in the following time slot i. This number may be greater than the number of headers received (when multicasting is taking place).

For the downlink, the headers are generated directly from headers received in time slot i, whereas routing is performed on the basis of headers received in time slot i−1 which corresponds to the output packets transmitted in time slot i.

Figure 2:
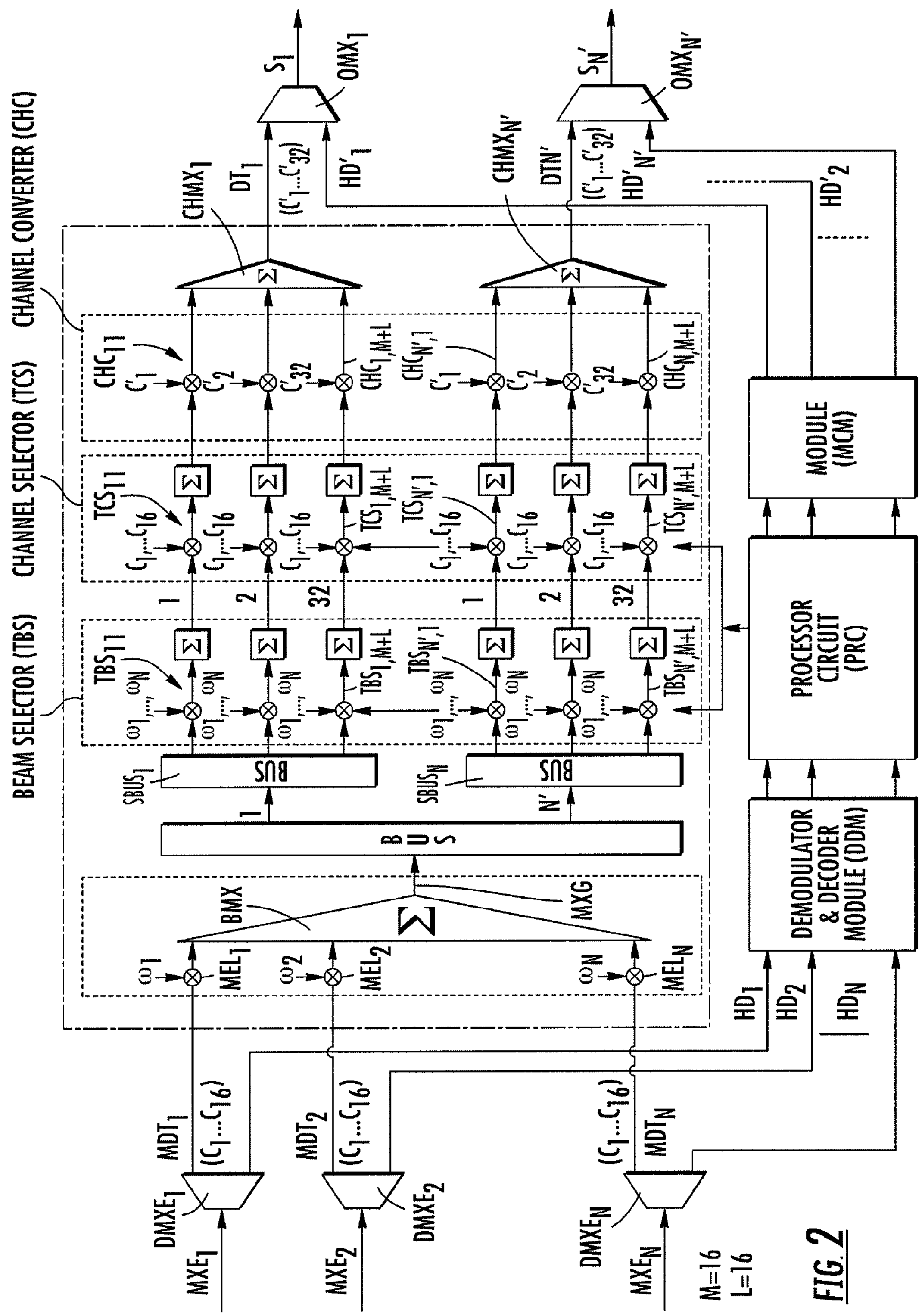
FIG. 2 shows an example of an architecture that implements the invention with code-division multiplexing.

FIG. 2 shows an embodiment of the architecture of FIG. 1 with input and output multiplexing taking place in code division (C/TDMA).

As an example, it is possible to use orthogonal Hadamard codes for code-division multiplexing of the input and output channels.

The users of the beams can access each code in time-division multiple access (TDMA) mode. The system allocates a code corresponding to a time sub-slot allocated to each user. Each user may be provided, for example, with a respective orthogonal code (a Walsh-Hadamard code) corresponding to a frequency band which is always the same, in conventional manner.

The data signals $MDT_1, \ldots, MDT_N$ are multiplexed in the multiplexer BMX by adding a beam spreading code $\omega_1, \ldots, \omega_N$ to each data signal, the beam spreading code corresponding to the uplink beam from which the data signal belongs. This operation is performed in mixers $MEL_1, \ldots, MEL_N$. The aggregate multiplexed signal MXG is supplied to a main bus BUS which is functionally connected to N' secondary buses $SBUS_1, \ldots, SBUS_{N'}$ which constitute the splitters $SPL_1, \ldots, SPL_{N'}$. The aggregate multiplexed signal MXG is thus duplicated to the N' secondary buses and it is accessible to the input of each of the M+L selection chains.

In the beam selection circuit TBS, the spreading codes $\omega_1, \ldots \omega_N$ are decoded ("despread").

For this purpose, for each packet to be routed to the first output, the circuit PRC sends the code ω corresponding to the beam in which said packet is to be found to a different beam selector $TBS_{1,1}, \ldots, TBS_{1,M+L}$. The channel code corresponding to the packet is sent to the channel selector $TCS_{1,1}, \ldots, TCS_{1,M+L}$ situated downstream from the beam selector which it has received said code ω. The same applies to the other outputs (2, 3, . . . , N').

For example, if the packet for routing by the selector $TBS_{1,3}$ belongs to the fifth uplink beam, then the circuit PRC sends the code $\omega_5$ to the selector $TBS_{1,3}$ and demultiplexing ("despreading") it performs on the spreading code $\omega_5$ so as to extract the data signal $MDT_5$ corresponding to the fifth input from the signal MXG accessible on the bus $SBUS_1$, where the data signal $MDT_5$ contains a maximum of M packets in the event of the system being maximally loaded.

Channel selection is performed in similar manner, but this time by demultiplexing ("despreading") the spreading codes $C_1, \ldots, C_M$ (e.g. Hadamard codes) for the data signals containing M packets that have previously been selected. For this purpose, for the first output, the circuit PRC sends that one of the codes $C_1, \ldots, C_M$ that corresponds to the packet that is to be selected (e.g. a Hadamard code of length 16 bits when M=16) to a different circuit $TCS_{1,1}, \ldots, TCS_{1,M+L}$. The same applies for the other outputs (2, 3, . . . , N'). The packets which are to be routed to each of the outputs are thus selected by each of the (M+L)N' circuits TCS for routing purposes.

In the channel converters $CHC_{1,1}, \ldots, CHC_{N'M+L}$, each packet is given a spreading code $C'_1, \ldots, C'_{M+L}$ allocated to each of the M+L chains and each corresponding to an output channel. These codes $C'_1, \ldots, C'_{M+1}$ (e.g. 32-bit Hadamard codes for M=16 and L=16) are generally the same for the N' outputs. Under such circumstances (the most common circumstances) where there are fewer than M+L packets to be routed to a given output, the remaining code (or frequency) is unoccupied.

The header groups $HD'_1, \ldots, HD'_N$ which are then multiplexed contain information relating to the transmission channel and possibly also additional information (subsequent routing, priority, etc. . . . ).

Since processing is performed in parallel and in real time with distributed access, e.g. by means of a bus, this architecture makes it possible to avoid using buffer memories and to avoid setting up queues for the data.

The data traffic is transparent since there is no need to demodulate or decode the data packets.

The asymmetry introduced by the presence of M+L output channels provides a high level of routing flexibility, and in particular makes it more efficient in handling multicasting functions where the same packet is routed to a plurality of outputs.

It is thus possible to have N' outputs where $N' \geqq N$, or $N' < N$. In the usual case, N'=N.

Figure 3:
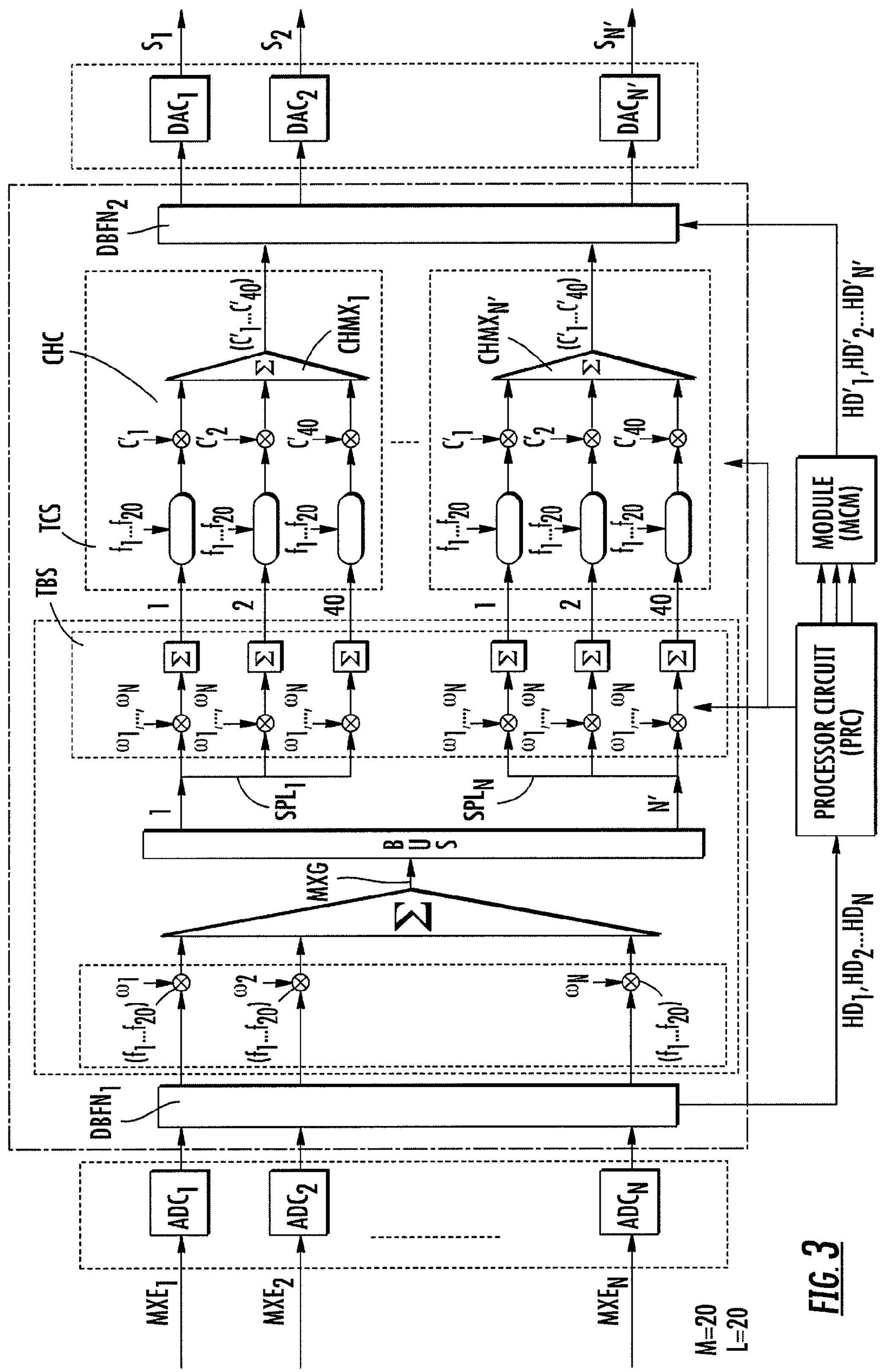
FIG. 3 shows an implementation of the invention with input frequency-division multiplexing (MF/TDMA) and output code-division multiplexing (C/TDM)

FIG. 3 shows a digital architecture corresponding to circumstances in which the incoming multiplexes are of the MF/TDMA type (i.e. having M frequency channels $f_1, f_i, \ldots, f_M$ where M=20 as an example) whereas the outgoing multiplexes are of the C/TDM type.

The signals at intermediate frequency $MXE_1, \ldots, MXE_N$ are converted into digital form by analog-to-digital converters $ADC_1, \ldots, ADC_N$, and are then introduced into a digital beam forming network $DBFN_1$.

The data signals corresponding to each of the beams are locally given a spreading code $\omega_1, \ldots, \omega_N$.

The selection of a beam from a locally generated spreading code $\omega_1, \omega_2, \ldots \omega_N$ is performed in the same manner as in FIG. 2, on the basis of information supplied by the circuit PRC.

Channel selection is performed using a controllable digital filter that can be tuned to the M frequencies $f_1, \ldots, f_M$ depending on the corresponding frequency supplied by the circuit PRC.

Channel conversion with the codes $C'_1, \ldots, C'_{M+L}$ is performed as in FIG. 2.

Output multiplexing can be performed as in FIG. 2 or else by using a digital beam forming circuit $DBFN_2$ and digital-to-analog converters $DAC_1, \ldots, DAC_{N'}$ for forming the N' output signals at intermediate frequency. The header groups $HD'_1, HD'_2, \ldots, HD'_{N'}$ for insertion into the output multiplex are supplied by the circuit MCM to the beam forming circuit $DBFN_2$.

Figure 4:
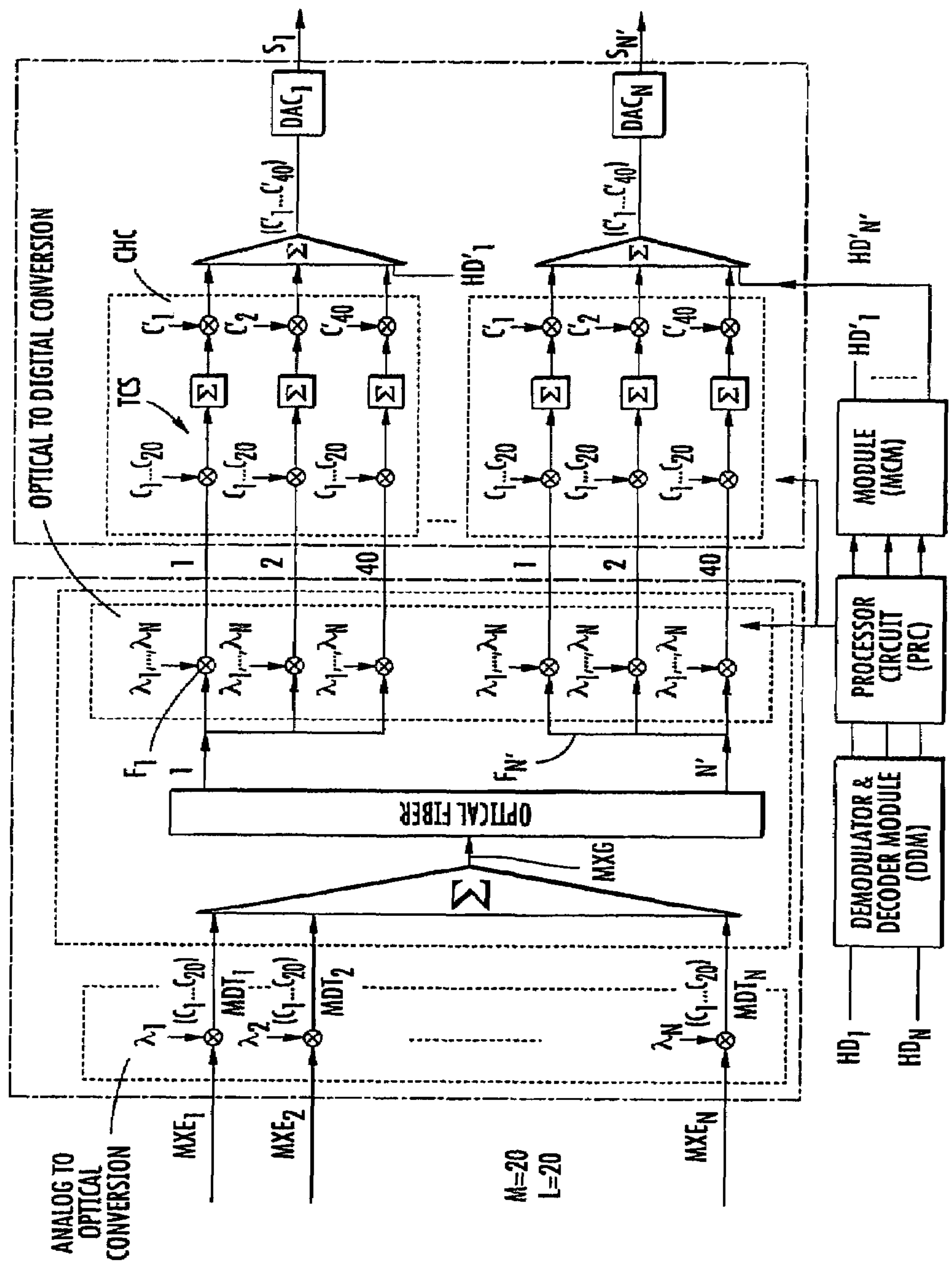
FIG. 4 shows another variant with hybrid optical/digital implementation using code-division multiplexing (C/TDMA).

FIG. 4 shows a hybrid optical/digital implementation of the invention with C/TDMA code-division multiplexing. The signals at intermediate frequency $MXE_1, \ldots, MXE_N$ are converted into optical signals. The header groups $HD_1, \ldots, HD_N$ are obtained by partial demultiplexing (not shown) of the signals $MXE_1, \ldots, MXE_N$. The data signals corresponding to each of the beams are allocated respective wavelengths $\lambda_1, \ldots, \lambda_N$. Beam selection on the basis of the locally generated wavelength $\lambda_1, \ldots, \lambda_N$ is performed by optical filters $F_1, \ldots, F_{N'}$ that can be tuned at the appropriate wavelength depending on the information provided by the circuit PRC.

Channel selection is performed in a manner similar to FIG. 2.

Channel selection with codes $C'_1, \ldots, C'_{M+L}$ is performed as in FIG. 2.

Output multiplexing can be performed as in FIG. 2, and digital-to-analog converters $DAC_1, \ldots, DAC_{N'}$ are used to form the N' output signals at intermediate frequency $S_1, \ldots, S_{N'}$.

What is claimed is:

1. A routing method for a multiplex system configured to receive N input multiplexes and provide N' output multiplexes, wherein each output multiplex has M+L channels with $L \geqq 0$, the method comprising:

receiving N input multiplexes, wherein each input multiplex includes M input channels and each input channel is configured to transport an input data packet and an associated input header, and wherein each input header identifies the corresponding data packet and specifies at least one output to which it is to be routed multiplexing the M multiplexed packets so as to generate an aggregate multiplexed signal comprising all of the multiplexed input data packets representing the N input multiplexes;

distributing the aggregate multiplex signal among inputs of N' processing chains, wherein each processing chain comprises M+L selection chains disposed in parallel;

demodulating and decoding each of the M input headers;

encoding and modulating the demodulated and decoded input headers to generate output headers;

selecting n data packets from the M+L selection chains corresponding to a $k^{th}$ output on the basis of the input headers corresponding to n data packets that are to be routed to the $k^{th}$ of the N' outputs, wherein said selecting step comprises selecting from the aggregate multiplexed signal each input multiplex that includes the data packets to be routed to the $k^{th}$ output and selecting from each of said selected input multiplexes each data packet to be routed to the $k^{th}$ output; and multiplexing the selected n data packets with corresponding n output headers in order to generate the $k^{th}$ output multiplex, where k=1, 2, ..., N'.

2. A method according to claim 1, wherein L is a non-zero integer.

3. A method according to claim 1, wherein each of the input multiplexes comprises data packets and a signalling channel containing headers, and wherein each of the N input multiplexes is demultiplexed in order to separate the headers from the data packets.

4. A method according to claim 1, wherein the aggregate multiplexed signal is generated by code- or frequency- or wavelength-division multiplexing for the N input multiplexes, a corresponding code, frequency, or wavelength being allocated to each input multiplex, and wherein the step of selecting from the aggregate multiplexed signal each input multiplex comprises demultiplexing using said code or frequency or wavelength.

5. A method according to claim 1, wherein the aggregate multiplexed signal is generated by code- or frequency- or wavelength-division multiplexing for the N input multiplexes, a corresponding code, frequency, or wavelength being allocated to each input multiplex, and wherein the step of selecting from the aggregate multiplexed signal each input multiplex comprises performing a first code- or frequency- or wavelength-division demultiplexing operation and wherein the step of selecting from each of said selected input multiplexes each data packet to be routed comprises performing a second code- or frequency- or wavelength-division demultiplexing operation.

6. A method according to claim 1, wherein said multiplexing of the selected data packets comprises:

code- or frequency- or wavelength-division multiplexing of the data packets to be routed to the $k^{th}$ output; and code- or frequency- or wavelength-division multiplexing of the headers corresponding to said data packets to be routed to the $k^{th}$ output.

7. A method according to claim 6, wherein the selected data packets and headers are multiplexed in the output multiplex of the $k^{th}$ output.

8. A device for routing a plurality of input multiplexes, wherein each input multiplex includes at most M multiplexed data packets and a corresponding routing header the device comprising:

a first system comprising:

an input multiplexing module configured to receive and multiplex N input multiplexes and configured to generate as output an aggregate multiplexed signal;

a distributor circuit in communication with the input multiplexing module and configured to distribute said aggregate multiplexed signal to an input of each of N' processing chains, wherein each of the N' processing chains is allocated to one of N' outputs of the device; and M+L selection circuits in parallel and each in communication with the distributor circuit, wherein each selection circuit comprises in series a beam selector, a channel selector, and a channel converter;

a second system comprising:

a demodulation and decoding circuit configured to receive the headers of each of the N input multiplexes and configured to demodulate and decode said headers;

a processor circuit in communication with the demodulation and decoding circuit and with the beam selectors and channel selectors of the first system, wherein the processor circuit is configured to process the demodulated and decoded input headers and to configure the beam selector and the channel selector in at least some of the M+L selection circuits in each of the processing chains so that each said selection circuit selects a data packet for routing to an output with which the data packet is associated;

a header generator module in communication with the processor circuit and configured to generate, for each output of the device, output headers corresponding to each output data packet outputted from said selection circuits of the first system; and an encoder and modulator circuit configured to encode and modulate the output headers generated by the header generator module;

wherein, for each of said selection circuits of the first system, the channel converter comprises means for adding to each of said data packets an output channel identification signal so as to place each output data packet belonging to the same output on different channels; and wherein the device further includes an output multiplexer module for each of said N' outputs of the device configured to multiplex the data packets allocated to said outputs with the output headers corresponding to said data packets.

* * * * *

UNITED STATES PATENT AND TRADEMARK OFFICE

CERTIFICATE OF CORRECTION

PATENT NO. : 7,471,703 B2
APPLICATION NO. : 10/706728
DATED : December 30, 2008
INVENTOR(S) : Herrero It is certified that error appears in the above-identified patent and that said Letters Patent is hereby corrected as shown below:

Column 3, line 4, after "with" the equation should read --$L \geq 0$--;

Column 6, line 14, after "wavelength)," the equation should read --$\omega_\ell$--;

line 15, after "beam" the equation should read --$(\ell$--;

Column 7, line 32, after "the code", the equation should read --$\omega_\ell$ $(\ell$--;

Column 10, line 22, after "where" the equation should read --$N' \geq N$--;

Column 11, line 13, after "with" the equation should read --$L \geq 0$--.

Signed and Sealed this

Seventeenth Day of March, 2009

JOHN DOLL

*Acting Director of the United States Patent and Trademark Office*